US008566798B2

(12) United States Patent
Derdak et al.

(10) Patent No.: US 8,566,798 B2
(45) Date of Patent: Oct. 22, 2013

(54) CAPTURING CONTEXT INFORMATION IN A CURRENTLY OCCURRING EVENT

(75) Inventors: Stefan Georg Derdak, San Jose, CA (US); Michael Joseph Casile, Fuquay Varina, NC (US); Andrew James McCright, Rochester, MN (US); Sinee Paungam, Naperville, IL (US)

(73) Assignee: International Business Machines Corporation, Armonk, NY (US)

( * ) Notice: Subject to any disclaimer, the term of this patent is extended or adjusted under 35 U.S.C. 154(b) by 1346 days.

(21) Appl. No.: 12/252,164

(22) Filed: Oct. 15, 2008

(65) Prior Publication Data

US 2010/0095101 A1 Apr. 15, 2010

(51) Int. Cl.
  *G06F 9/44* (2006.01)
(52) U.S. Cl.
  USPC .............................. 717/128; 717/125; 717/131
(58) Field of Classification Search
  None
  See application file for complete search history.

(56) References Cited

U.S. PATENT DOCUMENTS

| | | | | |
|---|---|---|---|---|
| 6,338,159 | B1 * | 1/2002 | Alexander et al. | 717/128 |
| 6,634,001 | B2 * | 10/2003 | Anderson et al. | 714/38.13 |
| 6,772,376 | B1 | 8/2004 | Merkin et al. | |
| 6,802,054 | B2 * | 10/2004 | Faraj | 717/128 |
| 6,954,923 | B1 * | 10/2005 | Yates et al. | 717/131 |
| 7,266,733 | B2 | 9/2007 | Bazinet et al. | |
| 7,343,521 | B2 | 3/2008 | Kitamorn et al. | |
| 7,493,598 | B1 * | 2/2009 | Craggs | 717/128 |
| 7,698,602 | B2 * | 4/2010 | Rand Mcfadden et al. | 717/128 |
| 7,757,215 | B1 * | 7/2010 | Zhou et al. | 717/124 |
| 7,765,293 | B2 * | 7/2010 | Adams et al. | 719/318 |
| 7,788,641 | B2 * | 8/2010 | Tarr et al. | 717/125 |
| 7,823,129 | B2 * | 10/2010 | Dimpsey et al. | 717/124 |
| 7,992,136 | B2 * | 8/2011 | Gray-Donald et al. | 717/131 |
| 2004/0024726 | A1 * | 2/2004 | Salem | 707/1 |
| 2004/0025146 | A1 * | 2/2004 | Kurihara et al. | 717/131 |
| 2004/0153847 | A1 * | 8/2004 | Apte et al. | 714/43 |
| 2005/0028145 | A1 * | 2/2005 | Kang et al. | 717/128 |
| 2005/0240826 | A1 * | 10/2005 | Dickenson et al. | 714/42 |
| 2006/0136877 | A1 * | 6/2006 | Gdaniec et al. | 717/127 |
| 2006/0195731 | A1 * | 8/2006 | Patterson et al. | 714/723 |
| 2006/0218562 | A1 * | 9/2006 | Broman et al. | 719/328 |
| 2007/0005734 | A1 * | 1/2007 | Abdo | 709/219 |

(Continued)

OTHER PUBLICATIONS

Mytkowicz et al., "Inferred Call Path Profiling", 2009 ACM, OOPSLA 2009, Oct. 25-29, 2009, Orlando, Florida, USA, pp. 1-15; <http://dl.acm.org/citation.cfm?doid=1639949.1640102>.*

(Continued)

*Primary Examiner* — Thuy Dao
*Assistant Examiner* — Ben C Wang
(74) *Attorney, Agent, or Firm* — Jordan IP Law, LLC

(57) ABSTRACT

According to a sample embodiment, a method is provided for capturing context information about an event. A data collector is created comprising instructions to collect specific context data in response to specific conditions in a call stack, and the data collector is registered with a first failure data capture application. In a sample embodiment the first failure data capture application receives a registration for a context data collector. Then, in response to being called, the first failure data capture application looks for at least one of a class and a method defined in the context data collection registration that matches conditions of the call stack. In response to said call stack conditions being met, the first failure data capture application calls the data collector to collect context data from the call stack, receives context data from the context data collector; and presents the context data.

11 Claims, 4 Drawing Sheets

(56) References Cited

U.S. PATENT DOCUMENTS

| | | | |
|---|---|---|---|
| 2007/0038896 A1* | 2/2007 | Champlin et al. | 714/38 |
| 2007/0174844 A1* | 7/2007 | Adams et al. | 719/318 |
| 2007/0239397 A1* | 10/2007 | Bourne et al. | 702/183 |
| 2008/0126873 A1* | 5/2008 | Cocker et al. | 714/38 |
| 2008/0127112 A1* | 5/2008 | Kettley et al. | 717/128 |
| 2008/0134148 A1* | 6/2008 | Clark | 717/128 |
| 2008/0222401 A1* | 9/2008 | Dewey et al. | 712/228 |
| 2008/0222456 A1* | 9/2008 | Jones | 714/45 |
| 2009/0164978 A1* | 6/2009 | Barker et al. | 717/128 |
| 2009/0193298 A1* | 7/2009 | Mukherjee | 714/38 |
| 2009/0204947 A1* | 8/2009 | Barker et al. | 717/125 |
| 2009/0300295 A1* | 12/2009 | Eccles et al. | 717/128 |
| 2010/0005455 A1* | 1/2010 | Gyure et al. | 717/128 |
| 2010/0011341 A1* | 1/2010 | Baierl et al. | 717/110 |
| 2010/0064179 A1* | 3/2010 | Champlin et al. | 714/38 |
| 2010/0332473 A1* | 12/2010 | Brodsky et al. | 719/328 |
| 2011/0067008 A1* | 3/2011 | Srivastava et al. | 717/128 |

OTHER PUBLICATIONS

Zhuang et al., "Accurate, Efficient, and Adaptive Calling Context Profiling", 2006 ACM, PLDI'06 Jun. 10-16, 2006, Ottawa, Ontario, Canada, pp. 1-32; <http://dl.acm.org/citation.cfm?doid=1133981.1134012>.*

Serrano et al., "Trace Construction Using Enhanced Performance Monitoring", 2013 ACM, CF'13, May 14-16, 2013, Ischia, Naples, Italy, pp. 1-10; <http://dl.acm.org/citation.cfm?doid=2482767.2482811>.*

Linford et al., "Isolating Runtime Faults with Callstack Debugging using TAU", 2012 IEEE High Performance Extreme Computing Conference—HPEC'12, pp. 1-34; <http://ieee-hpec.org/2012/index_htm_files/12_ID36.pdf>.*

Mutz et al., "Exploiting Execution Context for the Detection of Anomalous System Calls", 2007 Springer-Verlag Berlin Heidelberg, RAID 2007, LNCS 4637, pp. 1-20; <http://link.springer.com/content/pdf/10.1007%2F978-3-540-74320-0_1.pdf>.*

* cited by examiner

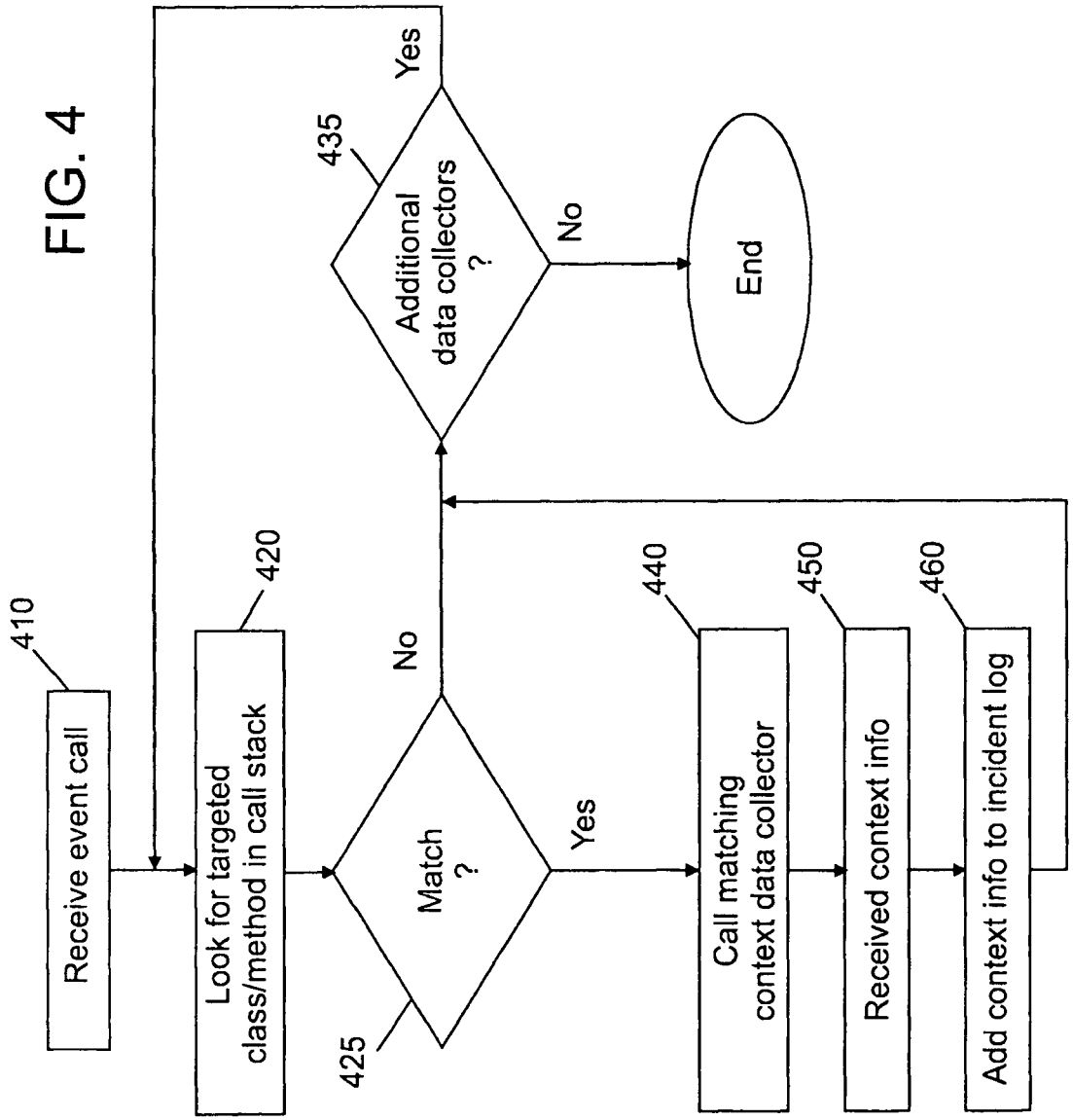

CAPTURING CONTEXT INFORMATION IN A CURRENTLY OCCURRING EVENT

FIELD OF THE INVENTION

The invention relates to the field of computer software and more particularly to apparatus, method and program product for capturing context information about a currently occurring event.

BACKGROUND

When an error or exception occurs in a software application, the problem is often recorded in a log file. This log file can then be analyzed in order to determine the cause of the problem and to take corrective action to prevent the problem from occurring again. However, in existing logging solutions the data that is recorded only takes into account the top method on the call stack at the time of the error or exception event. It does not take into account other methods on the call stack or other contextual data.

In many cases, when a problem is logged, it is necessary to try to recreate the problem to determine the exact cause of the problem. This is typically due to the log missing relevant information, such as context when the problem occurred. Recreating the problem is expensive, however, because often problems are difficult to recreate and they usually involve enabling tracing in the application, which hinders performance.

To prevent the need to recreate a problem, it is desirable to capture as much relevant information as possible about an error or exception condition. If enough information is generated when the error or exception occurs, then recreating the problem should not be necessary. However, it is not usually possible for an exception monitoring program in an object oriented code (OOC) such as Java, when catching an error or exception, to know the context in which the program is called (e.g. by a thread in a WebContainer, by a WebServices container, by a Portal engine, by an Enterprise Java Bean (EJB), by an EJB container, etc.). Context such as Webcontainer status, Webservice Container

SUMMARY

According to a sample embodiment, a method is provided for capturing context information about an event. A data collector is created comprising instructions to collect specific context data in response to specific conditions in a call stack, and the data collector is registered with a first failure data capture application. In a sample embodiment the first failure data capture application receives a registration for a context data collector. Then, in response to being called, the first failure data capture application looks for at least one of a class and a method defined in the context data collection registration that matches conditions of the call stack. In response to said call stack conditions being met, the first failure data capture application calls the data collector to collect context data from the call stack, receives context data from the context data collector; and presents the context data.

According to a sample embodiment, an apparatus is provided for capturing context information about an event. A server with an operating system running thereon executes a string of methods in a call stack. One or more memories are interconnected with the server. An exception logging application is stored on one of the memories and configured to collect and report information about the call stack in response to being called. A context data collection plug-in is stored on one of the memories and registered with the exception logging application. The context data collector is configured to collect identified information from the call stack in response to being called.

According to a sample embodiment, a computer program product is provided comprising a computer-readable media having stored thereon computer executable instructions. Instructions receive a registration for a context data collector identifying at least one of a class and a method. Instructions look for the least one of a class and a method identified in the context data collection registration that matches conditions of a call stack. Instructions call the data collector to collect context data from the call stack in response to the call stack conditions being met. Instructions receive context data from said context data collector. Instructions presenting the context data.

BRIEF DESCRIPTION OF THE DRAWINGS

The features and advantages of the invention will be more clearly understood from the following detailed description of the preferred embodiments when read in connection with the accompanying drawing. Included in the drawing are the following figures:

FIG. 4 is a flow diagram of a method for invoking a data collector in response to an event according to a sample embodiment of the present invention.

DETAILED DESCRIPTION

Figure 1:
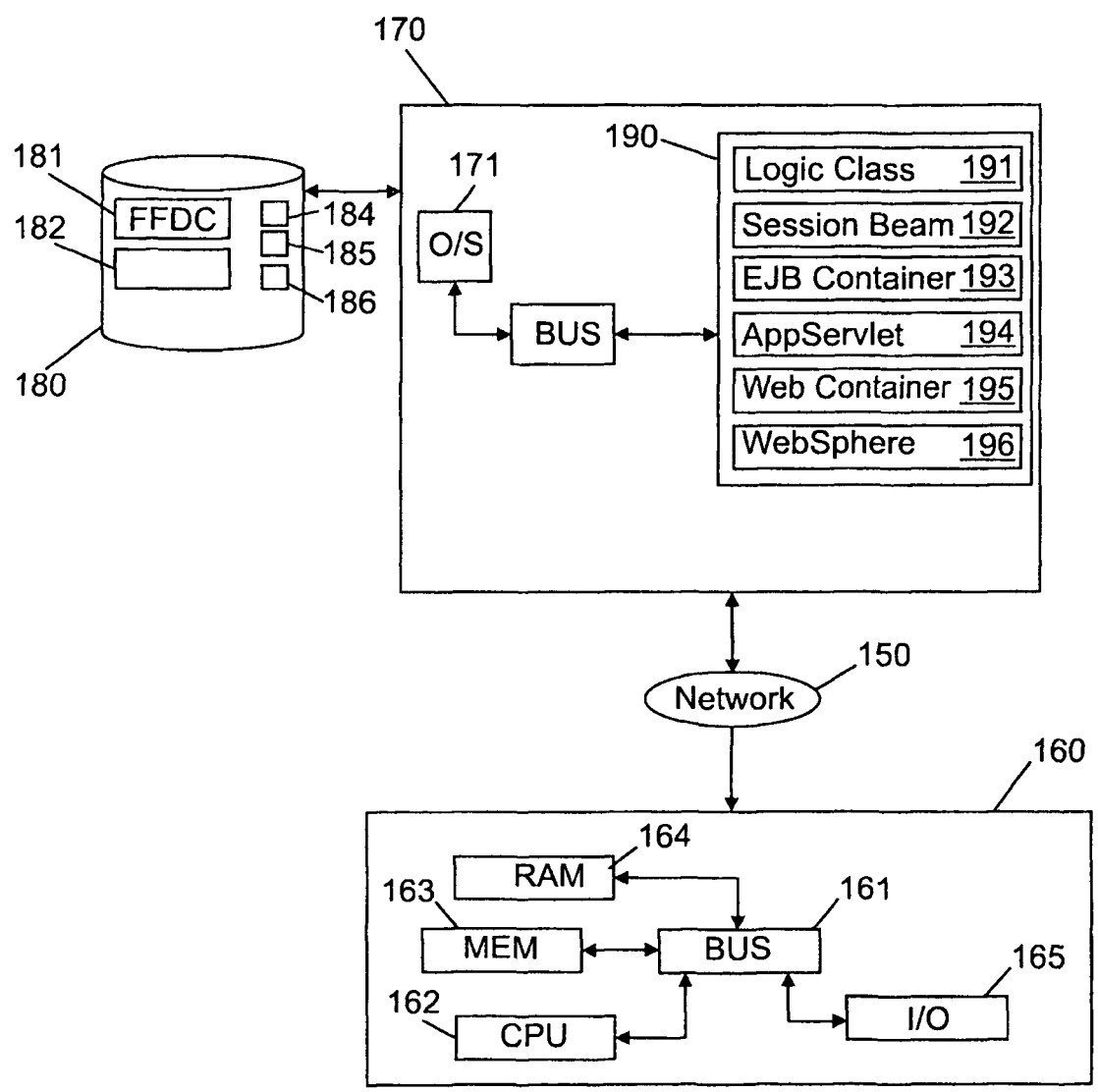
FIG. 1 is a block diagram of an apparatus for capturing context information about a currently occurring event according to a sample embodiment of the present invention.

The present invention provides a method, apparatus and program product for capturing context information about a currently occurring event.

According to an exemplary embodiment, a system comprises a server 170 having an operating system 171 operating thereon. The operating system may be any operating system suitable for a server, such as z/OS, WINDOWS®, Linux, or the like. One or more memories 180 are interconnected with the server 170. The server 170 also may be interconnected with one or more devices 160 through a network 150.

The server 170 runs an application 182 which may be stored on memory 180 as illustrated, or alternatively, may be stored on another memory (not shown) interconnected with the server 170 or on the networked device 160 through the network 150. When the operating system 171 runs an application 182, it creates thread a call stack 190. The call stack 190 is a dynamic data structure which stores information about the active subroutines of the application 182 in a stack (i.e., a logical thread in the reverse order that the subroutines or methods were called). In the illustrated sample embodiment for a java application, the call stack 190 comprise, in order, the methods: Logic Class 191, Session Bean 192, EJB Container 193, AppServlet 194, Web Container 195, and WebSphere 196.

In a sample embodiment, an error and exception logging application 181, such as a First Failure Data Capture (FFDC) application is stored on a memory 180. Alternatively, the FFDC may be accessed through a network. The FFDC 181 is called by an application 182 running on the server 170 in response to an error or an exception, or the like, which occurs in the application 182. The FFDC 181 provides pre-written rules that define what data is collected in the event of an error or an exception and how that data is logged. When the FFDC 181 is called, it retrieves data according to its collection rules and logs that information according to its logging rules (e.g., human readable log file, machine readable log file, etc.). In typical FFDC applications, the data that is collected is limited to the top method on the call stack when the error or exception occurs.

According to a sample embodiment, data collectors 184, 185, 186 may be registered with the error and exception logging application 181. These data collectors 184, 185, 186 may be dynamically created, independently of any application 182 that may be running or of the FFDC 181. The data collectors 184, 185, 186 are registered with the FFDC 181 with conditions in the call stack 190 for which they apply and they define contextual data to be collected. In this sample embodiment, when the FFDC 181 is called, it queries each data collector 184, 185, 186 that is registered to determine the call stack conditions for which it applies. Then, the FFDC 181 compares the defined conditions for each data collector 184, 185 with the actual conditions of the call stack 190. If the conditions match, then the FFDC 181 runs the matching data collector 184, 185, 186 and the data collector collects the defined contextual data.

Figure 2:
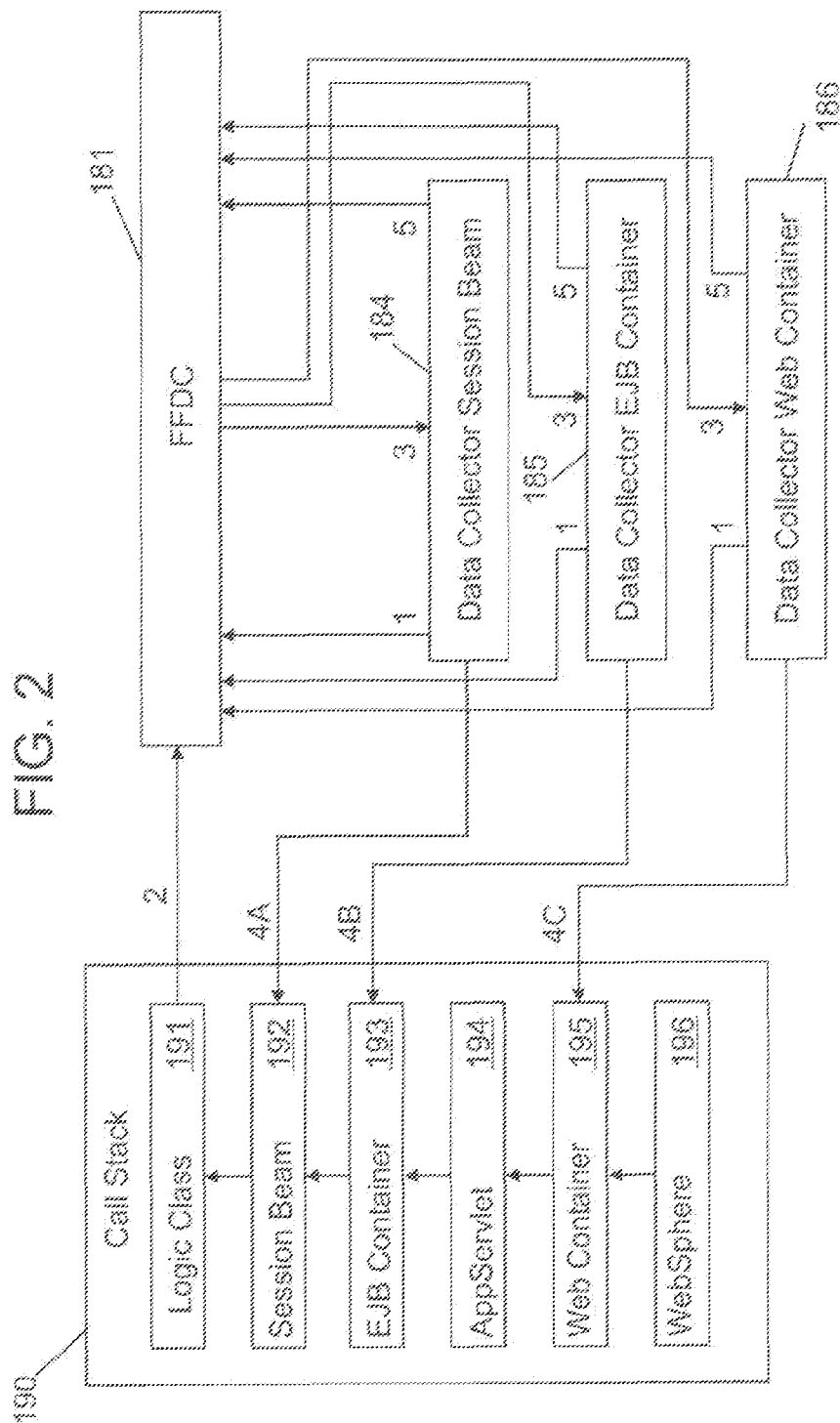
FIG. 2 is a block diagram of the interaction between a FFDC application, data collectors and the call stack in a server according to a sample embodiment of the present invention.

FIG. 2 shows the interaction between a FFDC application 181, Context Data Collectors 184, 185, 186 and the call stack 190 in a server according to a sample embodiment of the present invention. Context Data Collectors 184, 185, 186 define dynamically addable classes that implement a basic Application Program Interface (API). This API tells the FFDC 181 what to look for in the call stack 190 of the current thread (e.g. package, class, class/method, or class/method/signature) for each specific Context Data Collector 184, 185, 186.

The Context Data Collectors 184, 185, 186 are registered with the FFDC 181. In a sample embodiment, a programmer may add a Context Data Collector 184, 185, 186 for a component code. To accomplish this, the programmer may dynamically add a registration command for that data collector in the startup logic of that component code (step 1). Then, when the component code is launched, the component code registers the Context Data Collector with the FFDC 181. In the illustrated example, a data collector 184 is registered for the Session Bean. Another data collector 185 is registered for the Enterprise Java Bean (EJB) container. Yet another data collector 186 is registered for the Web Container.

It should be understood that data collectors may be registered for any method in the Call Stack 190, and that multiple Context Data Collectors 184,185, 186 may be registered for each method. Moreover, Context Data Collectors 184,185, 186 do not need to be available when the server 170 is started. Also, the Context Data Collectors 184,185, 186 do not need to come from the component calling the FFDC 181, or even from a software development function. The Context Data Collectors 184,185, 186 may also be dynamically loaded onto the server 170.

In a sample embodiment, the following stack trace occurs when a JavaServer Page (JSP) fails.

at com.ibm.ws.jsp.webcontainerext.JSP ExtensionServletWrapper.handleRequest (JSPExtensionServletWrapper.java:151)

at com.ibm.ws.jsp.webcontainerext.JSP ExtensionProcessor.handleRequest(JSPExtensionProcessor.java:255)

atcom.ibm.ws.webcontainer.webapp.WebApp.handle Request(WebApp.java:3177)

at com.ibm.ws.webcontainer.webapp.WebGroup.handle Request(WebGroupjava:253)

at com.ibm.ws.webcontainer.VirtualHost..handleRequest (VirtualHost.java:229)

at com.ibm.ws.webcontainer.webContainer.handle Request(WebContainer.java:1970)

at com.ibm.ws.webcontainer.channel.WCchannel Link.ready(WCChannelLink.java: 114)

at com.ibm.ws.http.channel.inbound.impl.HttpInbound Link.handleDiscrimination (HttpInboundLink.java: 472)

at com.ibm.ws.http.channel.inbound.impl.HttpInbound Link.handleNewInformation (HttpInboundLink.java: 411)

at com.ibm.ws.http.channel.inbound.impl.HttpInbound Link.ready(HttpInbound Link.java:288)

at com.ibm.ws.tcp.channel.impl.NewConnectionInitial ReadCallback.sendToDiscriminaters(NewConnection-InitialReadCallback.java:207)

at com.ibm.ws.tcp.channel.impl.NewConnectionInitial ReadCallback.complete(New ConnectionInitialReadCallback.java:109)

at com.ibm.ws.tcp.channel.impl.WorkQueueManager. requestComplete(WorkQueue Manager.java:566)

at com.ibm.ws.tcp.channel.impl.WorkQueueManager. attemptIO(WorkQueueManager.java:619)

at com.ibm.ws.tcp.channel.impl.WorkQueueManager. workerRun(WorkQueueManager.java:952)

at com.ibm.ws.tcp.channel.impl.WorkQueueManager $workerRun(WorkQueueManager.java:1039)

at com.ibm.ws.utl.ThreadPool$Worker.run(ThreadPool. java:1475)

Using existing logging and FFDC technology, it is possible to gather and report significant amounts of useful problem determination (PD) data from the top method in the stack (in this example, JSPExtensionServletWrapper.handleRequest). However, in order to identify the root cause of the problem, the troubleshooter may need to know additional information from other methods in the stack, such as the state of the Web Container, the HTTPInboundLink, or the WorkQueueManager, for example. To get this information using existing technology, the troubleshooter would need to have the user enable a performance-degrading trace function for these components and recreate the failure. This results in substantial time expenditure and performance reductions.

In the sample embodiment of FIG. 2, a programmer or troubleshooter writes Context Data Collector registration commands for various component codes in the startup logic of the respective component codes. The component codes then register their Context Data Collectors 184, 185, 186 with the FFDC 181 in response to launching their startup logic. Following is a sample registration code.

Ffdc ffdc=Ffdc.getFfdc( );

Ffdc.registerDataCollector ("com.ibm.ws.webcontainer.web Container.handleRequest", new WebContainerDataCollector( ));

When the startup logic is run for the component code, this would register a new WebContainer context data collector

186. It should be noted that the registration can be performed independent of the logic of the component code. Also, the registration can be performed dynamically for a component code that already exists. Accordingly, a troubleshooter can register a Context Data Collector 184, 185, 186 without a priori detailed knowledge of the logic, and it can be registered dynamically for an existing component. Additionally, the Context Data Collectors may be used to collect context data where it is not feasible to keep a detailed tracing. For example, if a problem is intermittent or infrequent, it may take days or even weeks to occur, and it is not feasible to keep a detailed trace for such as extended period of time.

Next, the programmer or troubleshooter writes a Context Data Collector 184, 185, 186 for the method/class for which he/she wants to collect data. For example, a troubleshooter might want to know the status and virtual host for the Web Container when an intermittent exception event occurs. Accordingly, the troubleshooter writes a Web Container Context Data Collector 186 to collect the desired data from the Web Container method 195 in the call stack 190. A sample Web Container Context Data Collector 186 might look like the following.

```
public interface DataCollector {
    public Collection collect ( Throwable ex );
}
public class WebContainerDataCollector implements DataCollector {
    public Collection collect ( Throwable ex ){
        Collection c = new ArrayList( );
        WebContainer wc = WebContainer.getWebContainer( );
        c.add ( wc.getState( ));
        c.add ( wc.getVirtualHost( ));
        ...
        Return c;
    }
}
```

It should be noted that this Context Data Collector 186 will collect the Web Container state and the Web container Virtual Host, even though the Web Container is not the top method on the call stack 190. Moreover, the Web Container state and the Web container Virtual Host are collected, in this example as data objects passed to the FFDC 181.

FIG. 2 shows a case in which a FFDC incident occurs. That is, an exception or an error occurs in the call stack thread. In response to the error or exception, the current or top method in the call stack 190 calls the FFDC 181 (step 2). It should be understood that methods in the call stack 190 have call commands written into their logic that call the FFDC 181.

In response to being called, the FFDC 181 executes FFDC logic. As a part of this FFDC logic, the FFDC 181 compares the Context Data Collector classes for each registered Context Data Collector 184, 185, 186 with the methods in the call stack 190. If any matches are found in the call stack 190 for the defined classes, then the matching Context Data Collector 184, 185, 186 is invoked (step 3). For example, if the Web Container Context Data Collector 186 described above is registered, then the FFDC 181 will call or invoke the Web Container Context Data Collector 186 if the string "com.ibm.ws.webcontainer.WebContainer.handleRequest" appears in the call stack. In the example call stack 190 described above, this string appears. Accordingly, the Container Context Data Collector 186 is invoked.

Upon invocation, the invoked Context Data Collector 184, 185, 186 drives logic that collects information that the code handling the event (i.e., the FFDC 181) would not otherwise know to collect (steps 4A, 4B, 4C). For example, in the above-described example, the Container Context Data Collector 186 will collect the state and virtual host for the Web Container 195 in the call stack 190. Other Context Data Collectors 184, 185, 186 may be created to provide additional useful information, such as the port number of the hypertext transport protocol (HTTP) transport, the HTTP request string, or the name of the failing JSP, for example.

This collected information is then reported in the FFDC log file (step 5). According to a sample embodiment, the Context Data Collectors do not write directly to the FFDC incident report. Instead, they provide a collection of data objects to the FFDC 181. The FFDC 181 then renders the data. This allows the FFDC 181 to control the output of the Context Data Collectors 184, 185, 186. The data may then be output to be human-readable or machine readable, depending upon the configuration of the FFDC 181.

Figure 3:
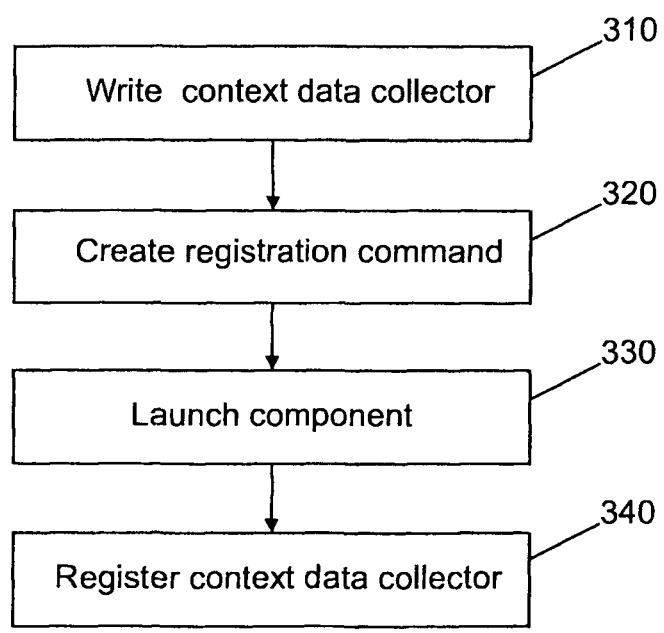
FIG. 3 is a flow diagram of a method for dynamically creating and registering a data collector according to a sample embodiment of the present invention.

FIG. 3 is a flow diagram of a method for dynamically creating and registering a data collector according to a sample embodiment of the present invention. A programmer or troubleshooter may decide that he/she wants to know information about various methods that are in a call stack 190 when an error occurs or that he/she wants to know if a particular condition applies in a call stack 190 when an error or exception occurs. For example, the programmer or troubleshooter may want to know the state of the Web Container 195 when an error occurs. Alternatively or additionally, the programmer or troubleshooter may want to know whether or not a particular HTTP port number or HTTP request string is used.

According to a sample embodiment, the programmer or troubleshooter first writes a Context Data Collector 184, 185, 186 (step 310). The Context Data Collector is a plug-in that defines a method and class of data that is collected, such as a particular HTTP port number or HTTP request string that is used. It should be understood that the steps need not necessarily be performed in the illustrated order.

Next, the programmer or troubleshooter creates a registration command (Step 320) to identify conditions in the call stack for which information is collected. According to a sample embodiment, the registration command is written into the startup logic for a software component. According to another sample embodiment, metadata is written into the Context Data Collector 184, 185, 186, and the metadata automatically registers the Context Data Collector 184, 185, 186 when the Context Data Collector 184, 185, 186 is started. The registration command may be created independently of the logic of the software component in which it is written and can be dynamically added to an existing software component in which problems are occurring. The registration command identifies 190 conditions in the call stack 190, such as a method or a combination of a method and class for which data is collected. The registration command may be created in a software component other than where the error or exception occurs. Moreover, the registration may be introduced to the server though a means other than start-up logic of a software component.

A user opens a software component with the registration command in it. This launches the startup logic for that software component (step 330). When the start-up logic is launched, the registration command registers the Context Data Collector 184, 185, 186 with the FFDC 181 (step 340). The Context Data Collector 184, 185, 186 is registered with the FFDC 181 by passing the identification of conditions in the call stack 190 for which the Context Data Collector 184, 185, 186 is called and the name and file path for the Context Data Collector 184, 185, 186.

FIG. 4 is a flow diagram of a method for invoking a data collector in response to an event according to a sample embodiment of the present invention. In response to an error or exception, logic in an application in which the error or exception occurred, calls the FFDC 181. The FFDC 181 receives the event call (step 410). The cause causes the FFDC 181 to execute FFDC logic.

The FFDC logic looks for targeted class/method combinations in the call stack 190. For each Context Data Collector 184, 185, 186 that is registered with the FFDC 181, identification of the targeted class/method is passed to the FFDC 181 during registration. The registered class/method identifications are compared with the actual conditions in the call stack 190 (step 425). If there are no matches, the FFDC determines whether or not there are additional Context Data Collectors 184, 185, 186 registered (step 435), and if so, the FFDC 181 looks for the targeted class/method for the next Context Data Collector 184, 185, 186 (step 420). It should be understood that the FFDC could alternatively look at the call stack first, and then look at the Context Data Collectors for a match.

If the registered class method for a Context Data Collector 184, 185, 186 matches the actual conditions in the call stack 190, then the FFDC 181 calls the matching Context Data Collector 184, 185, 186 (step 440). In response to being called by the FFDC 181, the Context Data Collector 184, 185, 186 executes data collection logic which collects targeted data. According to an exemplary embodiment, the targeted data is collected as data objects. The Context Data Collector 184, 185, 186 then passed the collected data to the FFDC 181.

The FFDC 181 receives the context information collected by the Context Data Collector 184, 185, 186 (step 450). Next, the FFDC 181 adds the collected context information to an incident log maintained by the FFDC 181 (step 460). According to a sample embodiment, the context information is provided in a human-readable or machine-readable format as defined by the FFDC 181.

The FFDC then determines whether or not there are additional Context Data Collectors 184, 185, 186 (step 435). If there are additional Context Data Collectors 184, 185, 186, the FFDC 181 repeats the steps of looking for targeted class/method (step 420), determining matches (step 425), calling matching Context Data Collectors 184, 185, 186 (step 440) and receiving context data (step 450) as applicable.

The invention can take the form of an entirely hardware embodiment, an entirely software embodiment, or an embodiment containing both hardware and software elements. In an exemplary embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system or device. For the purposes of this description, a computer-usable or computer readable medium may be any apparatus that can contain, store, communicate, propagate, or transport the program for use by or in connection with the instruction execution system, apparatus, or device.

The foregoing method may be realized by a program product comprising a machine-readable media having a machine-executable program of instructions, which when executed by a machine, such as a computer, performs the steps of the method. This program product may be stored on any of a variety of known machine-readable media, including but not limited to compact discs, floppy discs, USB memory devices, and the like. Moreover, the program product may be in the form of a machine readable transmission such as blue ray, HTML, XML, or the like.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk an optical disk. Current examples of optical disks include compact disk-read only memory (CD-ROM), compact disk-read/write (CD-R/W) and DVD.

The preceding description and accompanying drawing are intended to be illustrative and not limiting of the invention. The scope of the invention is intended to encompass equivalent variations and configurations to the full extent of the following claims.

What is claimed is:

1. A computer-implemented method for capturing context information about an event, the method comprising:
   creating a data collector comprising instructions to collect specific context data in response to specific conditions appearing in a call stack, wherein the data collector is a dynamically addable plug-in and is to identify at least one of a class and a method for data to collect;
   registering the data collector with a first failure data capture application;
   comparing said identified at least one of a class and a method from said registration with conditions in the call stack; and
   in response to said identified at least one of a class and a method matching said conditions in the call stack, capturing context data associated with said at least one of a class and a method matching said conditions in the call stack.

2. The method of claim 1, wherein registering the data collector comprises writing a registration command identifying call stack conditions for data collection.

3. The method of claim 2, wherein the registration command is written in the startup logic of a component code.

4. The method of claim 1, wherein the data collector defines a data object that identifies call stack information to collect.

5. The method of claim 4, wherein the data object is one of a method, a port, and an hyper text transfer protocol request string.

6. The method of claim 1, wherein the context data comprises at least one of: a state of a web container, a state of a hypertext transfer protocol inbound link, and a state of a work queue manager.

7. A computer-implemented method for capturing context information about an error or exception event, the method comprising:
   receiving a registration for a context data collector, wherein said context data collector is a plug-in registered by a registration command identifying at least one of a class and a method for data to collect, and wherein said registration command is dynamically added to startup logic;
   in response to being called, looking for said identified at least one of a class and a method defined in the registration that matches conditions appearing in the call stack;
   in response to said identified at least one of a class and a method matching said conditions in the call stack, calling said data collector to collect context data from said call stack;

receiving context data from said context data collector; and presenting said context data.

8. An apparatus for capturing context information about an event, comprising:
- a server with an operating system running thereon executing a string of methods in a call stack;
- one or more memories interconnected with the server;
- an exception logging application stored on one of said memories and configured to collect and report information about the call stack in response to being called;
- a context data collection plug-in stored on one of said memories, registered with said exception logging application by a registration command identifying at least one of a class and a method for data to collect, wherein said registration command is to be dynamically added to startup logic, and wherein said context data collection plug-in is to be configured to collect context data from said call stack in response to a comparison between said identified at least one of a class and a method from said registration and conditions appearing in the call stack, and in response to said identified at least one of a class and a method matching said conditions in the call stack.

9. The apparatus of claim 8 wherein said exception logging application is a first failure data capture program.

10. A computer program product comprising a non-transitory computer-readable storage medium having stored thereon computer executable instructions comprising:
- instructions for receiving a registration for a context data collector identifying at least one of a class and a method;
- instructions for looking for the least one of a class and a method identified in the context data collection registration that matches conditions appearing in a call stack;
- instructions for calling said data collector to collect context data from said call stack in response to said identified at least one of a class and a method matching said conditions in the call stack, wherein said data collector is to define a data object that identifies call stack information to collect, and wherein the data object is to be one of a method, a port, and a hypertext transfer protocol request string;
- instructions for receiving context data from said context data collector; and
- instructions for presenting said context data.

11. A computer program product comprising a non-transitory computer-readable storage medium having stored thereon computer executable instructions comprising:
- instructions for creating a data collector including instructions to collect specific context data in response to specific conditions appearing in a call stack, wherein the data collector is to be a dynamically addable plug-in and is to identify at least one of a class and a method for data to collect;
- instructions for registering the data collector with a first failure data capture application;
- instructions for comparing said identified at least one of a class and a method from said registration with conditions in the call stack; and
- instructions for, in response to said identified at least one of a class and a method matching said conditions in the call stack, capturing context data associated with said at least one of a class and a method matching said conditions in the call stack.

* * * * *